(12) United States Patent
Kobayashi et al.

(10) Patent No.: US 8,708,992 B2
(45) Date of Patent: Apr. 29, 2014

(54) PLASTIC FILM HAVING OXYGEN ABSORBING FUNCTION AND INFUSION BAG

(75) Inventors: Yukio Kobayashi, Tokyo (JP); Yohei Kageyama, Kawasaki (JP); Manabu Nakamura, Yokohama (JP); Masataka Kotani, Kawasaki (JP); Toshiharu Iwasaki, Kawasaki (JP)

(73) Assignee: Hosokawa Yoko Co., Ltd., Tokyo (JP)

( * ) Notice: Subject to any disclaimer, the term of this patent is extended or adjusted under 35 U.S.C. 154(b) by 0 days.

(21) Appl. No.: 13/504,323

(22) PCT Filed: Nov. 2, 2010

(86) PCT No.: PCT/JP2010/069477
§ 371 (c)(1),
(2), (4) Date: Apr. 26, 2012

(87) PCT Pub. No.: WO2011/052776
PCT Pub. Date: May 5, 2011

(65) Prior Publication Data
US 2012/0215196 A1    Aug. 23, 2012

(30) Foreign Application Priority Data

Nov. 2, 2009 (JP) .................................. 2009-251627

(51) Int. Cl.
*A61B 19/00* (2006.01)
*A61J 1/10* (2006.01)

(52) U.S. Cl.
CPC ........................................ *A61J 1/10* (2013.01)
USPC ........................................ 604/408; 604/403

(58) Field of Classification Search
CPC ...... A61J 1/10; A61M 1/0209; A61M 1/0259
USPC .................................. 604/403–410
See application file for complete search history.

(56) References Cited

U.S. PATENT DOCUMENTS

| 4,254,169 A | 3/1981 | Schroeder |
| 4,397,916 A | 8/1983 | Nagano |

(Continued)

FOREIGN PATENT DOCUMENTS

| CN | 1694808 A | 11/2005 |
| EP | 1 584 463 A1 | 10/2005 |

(Continued)

OTHER PUBLICATIONS

English machine translation of JP 09109274 to Eiichi et al.*

(Continued)

*Primary Examiner* — Philip R Wiest
*Assistant Examiner* — Benjamin Klein
(74) *Attorney, Agent, or Firm* — Sughrue Mion, PLLC

(57) ABSTRACT

The present invention relates to a plastic film for medical containers having an oxygen absorbing function including at least 4 layers (4) and formed by a co-extrusion method, and an infusion bag formed thereof, in which the 4 layers include: a first layer (1) constituted by a polyamide obtained by a ring-opening polymerization of a lactam 11 or more carbon atoms or by polycondensing of an ω-amino acid having 11 or more carbon atoms, or a polyamide obtained by copolycondensing a dicarboxylic acid having 10 or more carbon atoms and a diamine having 6 or more carbon atoms; a second layer (2) of a mixed composition that is adjacent to the first layer and contains an ethylene vinyl alcohol copolymer of an α-olefin and a monomer of an unsaturated carboxylic acid or an anhydride of an unsaturated dicarboxylic acid as the major component, and a transition metal salt and a polyene-based polymer having an unsaturated double bond as accessory components; a third layer (3) that is adjacent to the second layer and contains a copolymer of an α-olefin and an anhydride monomer of an unsaturated carboxylic acid or an unsaturated dicarboxylic acid as the major component; and a sealing layer containing a polyethylene as the major component.

15 Claims, 2 Drawing Sheets

(56) References Cited

U.S. PATENT DOCUMENTS

| | | | |
|---|---|---|---|
| 6,083,587 A | 7/2000 | Smith et al. | |
| 6,179,823 B1 * | 1/2001 | Niedospial, Jr. | 604/408 |
| 6,361,843 B1 * | 3/2002 | Smith et al. | 428/36.6 |
| 2003/0077466 A1 | 4/2003 | Smith et al. | |
| 2009/0061061 A1 | 3/2009 | Beckwith et al. | |
| 2012/0201984 A1 * | 8/2012 | Kobayashi et al. | 428/35.2 |

FOREIGN PATENT DOCUMENTS

| | | | | |
|---|---|---|---|---|
| JP | 55-90356 A | 7/1980 | | |
| JP | 56-120344 A | 9/1981 | | |
| JP | 9-109274 A | 4/1997 | | |
| JP | 09109274 A * | 4/1997 | | B29D 7/00 |
| JP | 2001-506200 A | 5/2001 | | |
| JP | 2004-010679 A | 1/2004 | | |
| JP | 2004010679 A * | 1/2004 | | C08G 83/00 |
| JP | 2005-280749 A | 10/2005 | | |
| JP | 2007-283565 A | 11/2007 | | |
| JP | 2008-037065 A | 2/2008 | | |
| JP | 2009-022753 A | 2/2009 | | |
| JP | 2009-154924 A | 7/2009 | | |
| RU | 2007 134 421 A | 3/2009 | | |
| TW | 200626126 A | 8/2006 | | |
| WO | 02/072350 A1 | 9/2002 | | |
| WO | 2006/102152 A2 | 9/2006 | | |
| WO | 2009/015024 A1 | 1/2009 | | |

OTHER PUBLICATIONS

English machine translation of JP2004010679 to Atsushi et al.*
International Search Report of PCT/JP2010/069477 dated Dec. 21, 2010.
Australian Office Action issued in Australian Patent Application No. 2010312385 dated Jan. 30, 2013.
Decision on Grant for corresponding Russian Application No. 2012120476 dated May 6, 2013.
Office Action for corresponding Japanese Application No. 2011-538522 dated May 14, 2013.
Corresponding Office Action in Taiwanese Application No. 099137466 dated Sep. 6, 2013.
Corresponding Extended European Search Report for Application No. 10826906.9 dated Oct. 11, 2013.
Chinese Office Action for corresponding Application No. 201080048762.9 dated Nov. 5, 2013.

* cited by examiner

PLASTIC FILM HAVING OXYGEN ABSORBING FUNCTION AND INFUSION BAG

TECHNICAL FIELD

The present invention relates to a plastic film having an oxygen absorbing function used for medical containers, and an infusion bag using such a plastic film.

Priority is claimed on Japanese Patent Application No. 2009-251627, filed Nov. 2, 2009, the content of which is incorporated herein by reference.

BACKGROUND ART

As medical containers such as bags for infusions, medial solutions, enteral nutrients, or the like, soft bags are used which are obtained from polyethylene, polypropylene, polyvinyl chloride, or the like and made into a bag by blow molding or heat sealing, in addition to glass bottles of the related art. Since such soft bags are light-weighted, have small volumes when the bags are disposed, and even do not require ventilation needles that cause nosocomial infection occurring during administration, soft bags are mainstream.

A film used in the soft bags of the related art is composed of a polyolefin material including polyethylene, polypropylene, or the like in order to reduce amount of eluted materials in steam autoclaving, and to maintain transparency and flexibility. However, oxygen transmission rate of the polyolefin material is large. That is, in order to prevent quality degeneration of a medical solution caused by an oxygen gas from outside, Patent Document 1, or the like has proposed that a soft bag should be packed with an outer packaging material having a high oxygen barrier property. Examples of such an outer packaging material are those including a layer formed of a metal foil, an inorganic vapor-deposited film, and the like.

However, amino acid infusions, fat infusions, and the like are mixed up with the air during dissolution, mixing, suspension, agitation, transfer by pump in a preparation and filming processes, causing the air to remain in such medical solutions as dissolved oxygen. The concentration of the dissolved oxygen is 3 to 50 ppm, and it is known that the dissolved oxygen brings about oxidation degradation of the medical solution. A reaction rate of the oxidation degradation is logarithmically promoted together with temperature. In other words, the oxidation degradation is dramatically accelerated in steam autoclaving. In order to prevent this, a method of putting or laminating a deoxygenating agent inside an outer packaging of an infusion bag, filling an inert gas into the outer packaging of an infusion bag, filling an infusion bag with a medical solution while being substituted with an inert gas, or adding antioxidants to a medical solution, has been invented in Patent Documents 2 and 3, and the like, and implemented. Putting and laminating a deoxygenating agent and filling with an inert gas are effective in suppressing oxidation degradation, but there are concerns that incorrect administration will cause damage or pinholes on the outer packaging that has a barrier property. Furthermore, since a dry lamination method that uses an organic solvent as a medium is used in laminating of the previously-applied art, not only is an eluted material an amount that is not negligible even though the amount is within the standard of the elution test prescribed in Japanese Pharmacopoeia, but also incorporation of foreign substances into the interface of lamination that is exposed during a lamination process is concerned. In addition, as antioxidants to be added to a medical solution, a vitamin C (ascorbic acid), a vitamin E (tocopherol), a BHT (dibutylhydroxytoluene), a BHA (butylhydroxyanisol), a sodium erythorbate, a sodium sulfite, a sulfur dioxide, a coffee bean extract (chlorogenic acid), a green tee extract (catechin), a rosemary extract, and the like are exemplary examples, but among these, a sulfite ion material is widely used as an additive due to the fact that it is highly effective in antioxidation. However, the material is not favorable for a human body since it can be the cause of anaphylactic shock, or the like.

Due to the above background, the following invention has been proposed, which gives an oxygen barrier property or an oxygen absorbing function to a container itself that directly contacts to a medicinal solution.

Patent Document 4 has proposed a five-layered structure that is obtained by making "a polyamide, a polyester, or a polyolefin layer", "a tie layer", "a core layer of an ethylene vinyl alcohol copolymer", "a tie layer", and "a polyolefin solution-contacting layer" in an order from outside into a film with a cast co-extrusion method. The structure of the publication is excellent in the oxygen barrier property, but has no self-oxygen absorbing ability. In addition, since film preparation in a roll shape by the way of casting makes a solution-contacting face exposed to outside in a soft bag preparation process, it was necessary to set up a countermeasure regarding the incorporation of foreign substances into the bag.

Patent Document 5 has proposed a multi-layered structure obtained by making into a film at least "an oxygen barrier layer composed of an ethylene vinyl alcohol copolymer", "an oxygen-absorbing gas barrier layer a", "an oxygen-absorbing gas barrier layer b", and "a heat-sealed resin layer" in order from the outside with a co-extrusion method. The structure in publication has excellent oxygen barrier property and the oxygen absorbing property under an ambient temperature environment. But, the ethylene vinyl alcohol copolymer of the outermost layer is poor in a damp-proofing property and is not favorable as it turns white in a medical container that has undergone a hydrothermal treatment such as steam autoclaving.

PRIOR ART DOCUMENT

Patent Document

[Patent Document 1] Japanese Patent Application, First Publication No. 2005-280749
[Patent Document 2] Japanese Patent Application, First Publication No. 2009-154924
[Patent Document 3] Japanese Patent Application, First Publication No. 2008-37065
[Patent Document 4] Japanese Patent Application, First Publication No. 2009-22753
[Patent Document 5] Japanese Patent Application, First Publication No. 2007-283565

SUMMARY OF INVENTION

Problem to be Solved by the Invention

As described above, the packaging that prevents oxidation degradation of a medical solution caused by oxygen in the related art had the following problems. Examples of such problems are damage and pinholes on an outer packaging, elution of organic solvent-based adhesives resulting from the use thereof, an anaphylactic shock caused by antioxidants added to a medical solution, oxygen degradation caused by dissolved oxygen, incorporation of foreign substances, an insufficient damp-proofing property, and whitening during steam autoclaving.

Means for Solving the Problem

In order to achieve the above object, the invention employs the following means. In other words:

(1) the invention is a plastic film used for a medical container which is composed at least of four layers, formed by a water-cooling inflation method of co-extrusion, and has an oxygen absorbing function. The plastic film includes: a first layer that contains a polyamide obtained from a ring-opening polymerization of a lactam having 11 or more carbon atoms or from polycondensation of an ω-amino acid having 11 or more carbon atoms, or a polyamide obtained from copolycondensation of a dicarboxylic acid having 10 or more carbon atoms and a diamine having 6 or more carbon atoms; a second layer that is adjacent to the first layer and contains as the main component an ethylene vinyl alcohol copolymer and as accessory components a transition metal salt and a polyene-based polymer having an unsaturated double bond; a third layer that contains a copolymer of an α-olefin and a monomer of an unsaturated carboxylic acid or an anhydride of an unsaturated dicarboxylic acid as the major component; and a sealing layer that contains a polyethylene as the main component.

(2) Alternatively, the invention is a plastic film used for a medical container which is composed at least of five layers, formed by a water-cooling inflation method of co-extrusion, and has an oxygen absorbing function. The plastic film includes: a first layer that contains a polyamide obtained from a ring-opening polymerization of a lactam having 11 or more carbon atoms or from polycondensation of an ω-amino acid having 11 or more carbon atoms, or a polyamide obtained from copolycondensation of a dicarboxylic acid having 10 or more carbon atoms and a diamine having 6 or more carbon atoms; a second layer that is adjacent to the first layer and contains a copolymer of an α-olefin and a monomer of an unsaturated carboxylic acid or an anhydride of an unsaturated dicarboxylic acid as the major component; a third layer that is adjacent to the second layer and contains as the main component an ethylene vinyl alcohol copolymer and as accessory components a transition metal salt and a polyene-based polymer having an unsaturated double bond; a fourth layer that is adjacent to the third layer and contains a copolymer of an α-olefin and a monomer of an unsaturated carboxylic acid or an anhydride of an unsaturated dicarboxylic acid as the major component; and a sealing layer that that contains a polyethylene as the main component.

(3) In the plastic film according to (1) and (2) described above, a layer of a mixed composition containing the ethylene vinyl alcohol copolymer as the main component and the transition metal salt and the polyene-based polymer having an unsaturated double bond as the accessory component may absorb 30 cc or more oxygen per gram, and the thickness of the layer of the mixed composition may be 5 to 35%.

(4) In the plastic film according to (1) to (3) described above, the melting peak temperature of the first layer may be 175° C. or higher, and the difference between the melting peak temperature of the first layer and the melting peak temperatures of the sealing layers may be 40° C. or larger.

(5) In the plastic film according to (1) or (2) described above, the sealing layer may be a mixture of 60 to 95 mass % of a linear low-density polyethylene and 5 to 40 mass % of a high-density polyethylene.

(6) In the plastic film according to (1) to (3) described above, the sealing layer may include two layers which are a layer that is adjacent to the fourth layer and has, as the main component, a co-polymer of an α-olefin and a monomer of an unsaturated carboxylic acid or an anhydride of an unsaturated dicarboxylic acid and a layer that is adjacent to the outer layer and composed of a high-density polyethylene.

(7) Alternatively, the invention is an infusion bag in which a pouring opening is provided on the main body of the infusion bag fanned of the plastic film according to (1) to (5).

Effects of Invention

This invention makes it possible to provide a plastic film that absorbs a dissolved oxygen in a medical solution, has an excellent barrier property against oxygen coming from outside, has an excellent hygienic safety defined by Japanese Pharmacopoeia, can be made into a film with easy by heat sealing under high temperature for a short period of time, has an extremely low possibility of incorporation of foreign substances originating from outside between film layers, and has heat resistance to endure steam autoclaving at temperature of 121° C., transparency, flexibility, and impact resistance strength. In addition, an infusion bag produced with the plastic film of the invention is equipped with the above-described features.

DESCRIPTION OF EMBODIMENTS

Hereinafter, the invention will be described in further detail.

Figure 1:
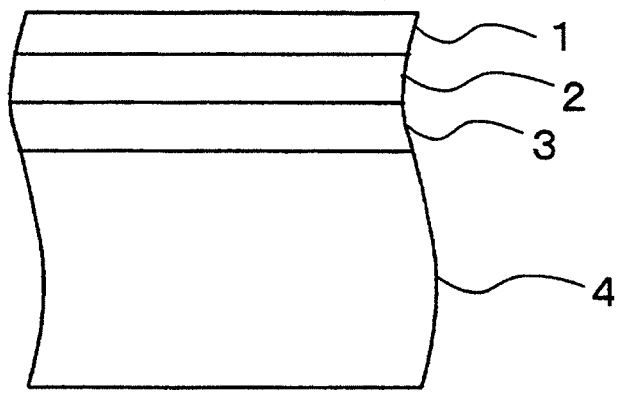
FIG. 1 is a partial cross-sectional view of an example of a plastic film according to the invention.

FIG. 1 shows a layer structure of an example of a plastic film according to a first aspect of the invention. It is essential for the film to be provided with four layers including, from the top, a first layer 1, a second layer 2, a third layer 3, and a sealing layer 4.

The first layer 1 (hereinafter, referred to as the outermost layer) is a layer that includes a polyamide obtained by conducting ring-opening polymerization for a lactam having 11 or more carbon atoms, or by conducting polycondensation for an ω-amino acid having 11 or more carbon atoms, or a polyamide obtained by conducting co-polycondensation for a dicarboxylic acid having 10 or more carbon atoms and a diamine having 6 or more carbon atoms. The second layer 2 (hereinafter, referred to as an oxygen absorbing layer) is a layer that is adjacent to the first layer 1, and of a mixed composition having a ethylene vinyl alcohol copolymer as the main components and a polyene-based polymer having an unsaturated double bond and a transition metal salt as the accessory components. The third layer 3 (hereinafter, referred to as an interlayer adhesive layer) is a layer that is adjacent to the second layer 2 and has a copolymer of an α-olefin and a monomer of an unsaturated carboxylic acid or an anhydride of an unsaturated dicarboxylic acid as the main component. The sealing layer 4 is a layer having a polyethylene as the main component.

The outermost layer is a buffer layer against film damage caused by external heating in a bag-making process for thermally adhering an opening member for discharging and injecting a medical solution, which is called a port. The first layer 1 is composed of a polyamide obtained through a ring-opening polymerization of a lactam having 11 or more carbon atoms or through polycondensation of an ω-amino acid having 11 or more carbon atoms. Alternatively, the first layer 1 is composed of a polyamide obtained through co-polycondensation of a dicarboxylic acid having 10 or more carbon atoms and a diamine having 6 or more carbon atoms.

The lactam that has undergone ring-opening polymerization has 11 or more carbon atoms, but the upper limit of the number of carbon atoms, is 12. If the number of carbon atoms of a lactam monomer is less than 11, it is not favorable in that a depolymerization reaction of a polyamide easily occurs when used under high temperature, the medical container falls short of the elution test standards defined for such a container, and whitening occurs during steam autoclaving under high pressure due to a high hygroscopic property.

As an example of a lactam, an undecane lactam, a lauryl lactam, or the like are exemplary. The method of ring-opening polymerization is well known as the production method of a polyamide, and found on the market. If ring-opening polymerization is conducted for an undecane lactam, nylon 11 is obtained, and if ring-opening polymerization is conducted for a lauryl lactam, nylon 12 is obtained.

The number of carbon atoms of ω-amino acid that has undergone polycondensation is also 11 or more, but the upper limit of the number of carbon atoms is 12. If the number of carbon atoms is less than 11, there is the same problem as that of the polyamide obtained from the ring-opening polymerization of the lactam. As an example of a ω-amino acid, a ω-aminoundecanoic acid, or a ω-aminododecanoic acid are exemplary, and the method of the polycondensation is also well known as a production method of a polyamide, and also found on the market.

A dicarboxylic acid used when conducting co-polycondensation for a dicarboxylic acid and a diamine has 10 or more carbon atoms, and the upper limit of the number of carbon atoms is 12. As an example of the dicarboxylic acid, a sebacic acid, a dodecanedioic acid, or the like are exemplary. The diamine has 6 or more carbon atoms. As an example of a diamine, a hexamethylene diamine, or the like are exemplary. The method of the co-polycondensation is well known as the production method of a polyamide, and is also found on the market. If a sebacic acid undergoes co-polycondensation with a hexamethylene diamine, nylon 610 is obtained, and if a dodecanedioic acid undergoes co-polycondensation with a hexamethylene diamine, nylon 612 is obtained.

A polyamide obtained from any one of the three methods above may be used alone, or may be mixed at an arbitrary ratio.

A polyamide to be used may have a melting peak temperature of 175° C. or higher, preferably have about 175 to 245° C., and further preferably have about 175 to 230° C. As a measuring method for the melting peak, the melting peak was measured based on JIS-K7121 using a DSC, a differential scanning calorimeter.

The thickness of the first layer 1 is 2 to 15% of the total thickness, and preferably 2 to 10% of the total thickness, and more preferably 2 to 8% of the total thickness. If the thickness of the first layer 1 is less than 2% of the total thickness, the buffer effect against damage caused by heat transmission during sealing is not sufficient. If the thickness of the first layer 1 exceeds 15% of the total thickness, rigidity as a multi-layered film remarkably increases, and flexibility as a medical container deteriorates.

The second layer 2 is an oxygen absorbing layer, and is a mixed composition having the ethylene vinyl alcohol copolymer as the main component, and a transition metal salt and polyene-based polymer having an unsaturated double bond as accessory components.

The ethylene vinyl alcohol copolymer is the main component, and the ethylene content is about 25 to 45 mol %, and preferably 27 to 44 mol %.

The polyene-based polymer which is an accessory component and has an unsaturated double bond is a polymer having units of carbon hydrides of which the number of double bonds is 2 or more. A preferable polyene-based polymer is a conjugated diene polymer, and for example, a linear polymer and a cyclic polymer such as a polyisoprene that is a polymer of a cis- or a trans-1,4-isoprene that is a linear conjugated diene, a polyisoprene that includes a cyclized polyisoprene obtained by a peri-cyclic reaction of a polyisoprene, a polybutadiene that is a polymer of a 1,3-butadiene that is a linear conjugated diene, a polybutadiene that includes a cyclized polybutadiene obtained by a peri-cyclic reaction of a polybutadiene, or the like. The content of the polyene-based polymer is about 20 to 40 mass %, and preferably about 25 to 35 mass %.

As examples of the transition metal salt of the accessory component, there are salts of iron, nickel, copper, manganese, cobalt, rhodium, titanium, chromium, vanadium, ruthenium, and the like. As an acid to form a salt, an organic acid, particularly, a monocarbonic acid is good, and for example, a stearic acid, a neodecanoic acid, and the like are appropriate. As examples of a preferable transition metal salt, a stearic acid cobalt, and a neodecanoic acid cobalt are exemplary. The content of the transition metal acid is 50 to 500 ppm, and preferably, 100 to 300 ppm.

The polyene-based polymer in which the ethylene vinyl alcohol copolymer is mixed as the main component and the transition metal salt absorb oxygen generating alcohol, aldehyde, ketone, and a carboxylic acid through an oxidative cleavage reaction of the polyene-based polymer with the transition metal salt as a catalyst. It is preferable that the composition of the mixed composition in the invention include a conjugated diene component that absorbs oxygen equal to or more than 30 cc per gram. The thickness of the second layer 2 is 5 to 35% of the total thickness of the plastic film, and preferably 10 to 30%. If the thickness of the second layer 2 is less than 5% of the total thickness, the oxygen absorbing function becomes insufficient. On the other hand, if the thickness of the second layer 2 exceeds 35% of the total thickness, the layer has oxygen absorbing function beyond necessity. Furthermore, it is not favorable that the physical property of strength as a film is impaired and that the manufacturing cost unnecessarily rises.

As commercialized products of such a mixed composition having the oxygen absorbing function, "Proact" the product name of Kuraray Co., Ltd., "Quintier" of Zeon Corporation, and the like can be used.

The third layer 3 is an interlayer adhesive layer that has a damp-proofing property and is arranged between the second layer 2 and the sealing layer 4 to be described later, and has, as the main component, a copolymer of an α-olefin and a monomer such as an unsaturated carboxylic acid or an anhydride of an unsaturated dicarboxylic acid.

As the α-olefin, ethylene, propylene, or the like are exemplary. A polyolefin that is a homopolymer or a copolymer of ethylene, propylene, or the like is obtained by performing homopolymerization or copolymerization for an olefin by using a catalyst system (Ziegler catalyst) obtained from a transition metal compound and an organic aluminum compound, using a catalyst system (Phillips catalyst) obtained by causing an elemental substance (for example, silica) to support a compound of chromium (for example, a chromic oxide), or using a radical initiator (for example, an organic peroxide).

In addition, the monomer such as an unsaturated carboxylic acid or an anhydride of an unsaturated dicarboxylic acid used in the invention is a compound having at least one double bond and containing at least one carboxyl group or an anhydride (group) thereof, and a (meta)acrylic acid, a maleic acid, a phthalic acid, a maleic anhydride, a phthalic anhydride, an itaconic acid, a citraconic acid, an endic acid, an itaconic anhydride, an endic anhydride, a citraconic anhydride, or the like are exemplary.

A copolymer of an α-olefin and a monomer such as an unsaturated carboxylic acid or an anhydride of an unsaturated dicarboxylic acid used in the third layer 3 refers to a graft copolymer of an unsaturated monomer and the above-described polyolefin. The graft copolymer is obtained by supplying to an extruder a mixture obtained by adding 0.01 to 20 pts. mass of an unsaturated monomer and 0.001 to 20 pts. mass of an organic peroxide to 100 pts. mass of a polyolefin, and melting the mixture to react.

As typical examples of the organic peroxide used in the invention, t-butyl peroxybenzoate, 2,5-dimethyl-2,5-di(t-butyl peroxy)hexane, and di-t-butyl peroxide are exemplary. Among the organic peroxides, an organic peroxide having one minute half-life period temperature which is 100 to 280° C. is desirable, and an organic peroxide having one minute half-life period temperature which is 120 to 230° C. is preferable. Such organic peroxides may be used alone, or two or more kinds thereof may be used together.

If less than 0.01 pts. mass of the monomer such as an unsaturated carboxylic acid or an anhydride of an unsaturated dicarboxylic acid is blended with 100 pts. mass of a polyolefin, the adhesiveness between the obtained copolymer and the ethylene vinyl alcohol copolymer and a polyamide to be described later is poor. On the other hand, if the blended ratio exceeds 20 pts. mass, efficiency of graft reaction is lowered, Thus, quite an amount of unsaturated compounds that are unreacted or monopolymerized remains during the graft reaction, and even the intrinsic physical properties of the polyolefin are impaired.

In addition, if less than 0.001 pts. mass of an organic peroxide is blended with 100 pts. mass of a polyolefin, a satisfactory graft copolymer is not obtained. On the other hand, if the ratio exceeds 20 pts. mass, the intrinsic physical properties of the polyolefin are impaired.

The mixture thus prepared is input to a general extruder, melt and kneaded therein undergoing graft reaction, and then a graft modified material is obtained. At this time, as the extruder used, both types of a non-vented extruder and a vented extruder may be used, but a vented extruder is desirable in terms of eliminating the unsaturated compounds that are unreacted or monopolymerized and decomposition products of organic peroxides. Furthermore, the kneading temperature is 230 to 300° C., and the temperature may vary depending on the kind of a polyolefin and organic peroxide to be used, but 230 to 250° C. is desirable. In addition, the residence time of the mixture in the extruder is 60 seconds or longer, and particularly, 90 seconds or longer is preferable. The graft reaction does not proceed well in the kneading temperature lower than 230° C. On the other hand, if the kneading temperature exceeds 300° C., part of the polyolefin starts deteriorating. In addition, if the residence time of the mixture in the extruder is less than 60 seconds, satisfactory graft reaction does not occur.

There are commercialized products of the copolymer of an α-olefin and an unsaturated carboxylic acid or an anhydride of an unsaturated dicarboxylic acid, and such commercialized products may be used.

The third layer 3 of the invention may use the copolymer alone, or a mixed composition of the copolymer and the polyolefin. In the latter case, a ratio of the melt viscosity of the copolymer and the melt viscosity of the polyolefin η (polyolefin)/η (copolymer) under a constant temperature is preferably 2.0 or higher. In the case of a ratio less than 2.0, the copolymer and the polyolefin tend to be uniformly microdispersed. Thus, a polar group existing on the interface between the polyamide to be described later and the ethylene vinyl alcohol copolymer is diluted, whereby adhesive force tends to decrease.

The third layer 3 is a layer having the copolymer of the α-olefin and the unsaturated carboxylic acid or the anhydride of an an unsaturated dicarboxylic acid, as the main component, and the total amount of the third layer 3 may be constituted by the copolymer. On the other hand, other resins can also be included. In this case, the adhesive intensity is lowered, but as a result of an experiment conducted by the Applicant, the third layer 3 can be prepared even with a mixture of a 50% copolymer and a 50% polyethylene.

The thickness of the third layer 3 is 2 to 15%, and preferably 2 to 10% of the total thickness of the plastic film. If the thickness of the third layer 3 is less than 2% thereof, adhesiveness with the polyamide to be described later and the ethylene vinyl alcohol copolymer becomes insufficient. If the thickness of the third layer 3 exceeds 15%, it is not preferable that the physical property of strength as a film is impaired, and the production cost unnecessarily increases.

The sealing layer 4 of the invention refers to the layer adjacent to the inner side of the third layer 3 having a polyethylene as the main component, and may be a single layer or multiple layers. As examples of the polyethylene of the sealing layer 4, a low-density polyethylene, a high-density polyethylene, and a linear low-density polyethylene are exemplary, and may be a single composition or a mixed composition thereof. Among these examples of polyethylene, a mixture of 60 to 95 mass % of a linear low-density polyethylene that is excellent in transparency, flexibility, and impact resistance and 5 to 40 mass % of a high-density polyethylene that is excellent in heat resistance is preferable in that the mixture has a property that supplements each other.

The linear low-density polyethylene of the invention refers to a copolymer of ethylene and one or more kinds of an α-olefin selected from α-olefins having 3 to 20 carbon atoms. Among the α-olefins having 3 to 20 carbon atoms, an α-olefins having 3 to 12 carbon atoms is preferable. Specifically, propylene, 1-butene, 1-pentene, 4-methyl 1-pentene, 1-hexene, 1-octene, 1-decene, 1-dodecene, and the like are exemplary examples, and propylene, 1-butene, 1-hexene, and 1-octene are preferable. The content amount of α-olefin contained in the copolymer is generally 1 to 30 mol %, and preferably 3 to 20 mol %. In addition, the density of the linear low-density polyethylene by JIS-K7112-D method is 0.900 to 0.940 g/cm$^3$, and a melt mass-flow rate (MFR) measured under conditions of temperature of 190° C., and load of 21.18N based on JIS-K7210 can preferably use a linear low-density polyethylene having a rate of 0.1 to 20 g/10 minutes.

As the high-density polyethylene of the invention, a high-density polyethylene having density of 0.940 to 0.970 g/cm$^3$, and an MFR of 0.1 to 20 g/10 minutes can be preferably used. The measurement conditions of the density and the MFR is the same as those of the linear low-density polyethylene.

In addition, in order to enhance transparency and heat resistance, a crystal nucleating agent may be added to the polyethylene of the sealing layer 4. As an example of a preferable crystal nucleating agent, a mixture of cyclohexane dicarboxylic acid calcium salt and zinc stearate is exemplified, but it is possible to blend the nucleating agent with the sealing layer 4 so that the agent accounts for 2.5 mass % or less of the total mass of the sealing layer. The lower limit of the amount of the nucleating agent to be added is about 0.5 mass %.

The melting peak temperature of the sealing layer 4 is equal to or lower than the melting peak temperature of the first layer 1, and the difference between the melting peak temperature of the first layer 1 and the melting peak temperature of the sealing layer 4 is 40° C. or higher, preferably 45° C. or higher. If the difference of the temperatures is less than 40° C., it is not preferable in that it is easy for the film to get damaged by heat sealing. Though the upper limit of the difference of the melting peak temperatures is not particularly limited, it is generally around 100° C. If the difference of melting points of the first layer 1 and the sealing layer 4 is too large, the sealing layer 4 is also produced into a film at a high temperature in coextrusion. Accordingly, melt viscosity of the sealing layer 4 remarkably deteriorates, and therefore, stable film production cannot be attained.

The thickness of the sealing layer 4 is 30 to 89%, preferably 35 to 85%, and more preferably 35 to 80% of the total thickness of the plastic film. If the thickness of the sealing layer 4 is less than 30% thereof, the physical property of strength as a film is impaired. If the thickness exceeds 89% thereof, the thickness of the first layer to the third layer is insufficient.

All measured values of the plastic film of the invention for each test stipulated in Plastic Pharmaceutical Container Test Act of General Test Act of the First Part of Japanese Pharmacopoeia, Fifteenth Edition are within the specifications of a polyethylene or polypropylene containers for aqueous injections.

Figure 2:
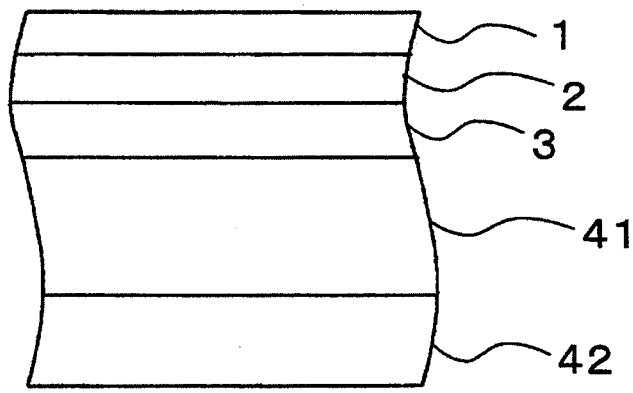
FIG. 2 is a partial cross-sectional view of a modified example of the plastic film according to the invention.

A layer structure of a modified example of the plastic film of the first aspect is shown in FIG. 2. The film is structured with five layers including, from the top, the first layer 1, the second layer 2, the third layer 3, a sealing layer 41 maintaining transparency and flexibility, and a direct-melt sealing layer 42 adjacent to the sealing layer 41.

When the sealing layers are set to be two layers, it is preferable to set the sealing layer 41 to be the main layer. More specifically, a thickness ratio of the sealing layer 41 adjacent to the third layer to the direct-melt sealing layer 42 is preferably in the range of 50 to 97:50 to 3, and further preferably 70 to 95:30 to 5.

Specifically, the sealing layer 41 adjacent to the second layer is set to be a mixture of 60 to 95 mass % of linear low-density polyethylene and 5 to 40 mass % of high-density polyethylene as a resin of the sealing layer to be used, and the direct-melt sealing layer 42 is set to a layer only including high-density polyethylene. By setting the sealing layers as above, it is possible to reliably prevent blocking occurring when parts of the surfaces of the sealing layers tightly stick to each other after steam autoclaving.

Figure 3:
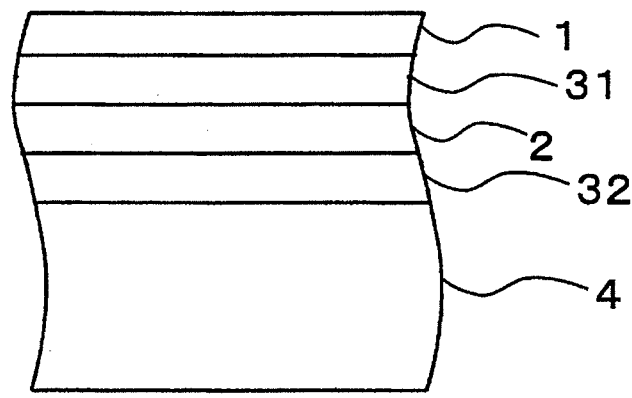
FIG. 3 is a partial cross-sectional view of another modified example of the plastic film according to the invention.

FIG. 3 shows a layer structure of an example of a plastic film of a second aspect of the invention. The film has a five-layer structure including, from the top, the first layer 1, the second layer 31, a third layer 2, a fourth layer 32, and a sealing layer 4. In the second aspect of the plastic film of the invention, the first layer 1 (outermost layer) is a layer composed of a polyamide obtained by performing ring-opening polymerization for a lactam having 11 or more carbon atoms or polycondensation for an ω-amino acid having 11 or more carbon atoms, or a polyamide obtained by performing co-polycondensation for an dicarboxylic acid having 10 or more carbon atoms and a diamine having 6 or more carbon atoms. The second layer 31 (first interlayer adhesive layer) is a layer that is adjacent to the first layer and has a copolymer of an α-olefin and a monomer of an unsaturated carboxylic acid or an anhydride of an unsaturated dicarboxylic acid as the main component. The third layer 2 (oxygen absorbing layer) is a layer that is adjacent to the second layer and has an ethylene vinyl alcohol copolymer as the main component and a polyene-based polymer having an unsaturated double bond and a transition metal salt as accessory components. The fourth layer 32 (second interlayer adhesive layer) is a layer that is adjacent to the third layer and has a copolymer of an α-olefin and a monomer of an unsaturated carboxylic acid or an anhydride of an unsaturated dicarboxylic acid as the main component. The sealing layer 4 is a layer having polyethylene as the main component.

Among the layers, description of the outermost layer, the oxygen absorbing layer, the first and the second interlayer adhesive layer, and the sealing layer (excluding the layer thicknesses) is the same as that of the outermost layer, the oxygen absorbing layer, the interlayer adhesive layer, and the sealing layer of the above-described first aspect. The thickness of the sealing layer is 30 to 89%, and preferably 35 to 85% of the total thickness.

In other words, the difference between the plastic film of the first aspect and the plastic film of the second aspect is that an interlayer adhesive layer having a damp-proofing property is also provided between the outermost layer and the oxygen absorbing layer. By arranging the adhesive layer, it is possible to suppress the oxygen absorbing layer from absorbing moisture and being whitened in a steam autoclaving process.

The total thickness of the film of the invention is not particularly limited. But considering transparency, flexibility, impact resistance, water vapor permeability, and the like, both films of the first and the second aspects are preferably 50 to 1000 μm, appropriately 100 to 350 μm, and particularly preferably 150 to 250 μm.

Figure 4:
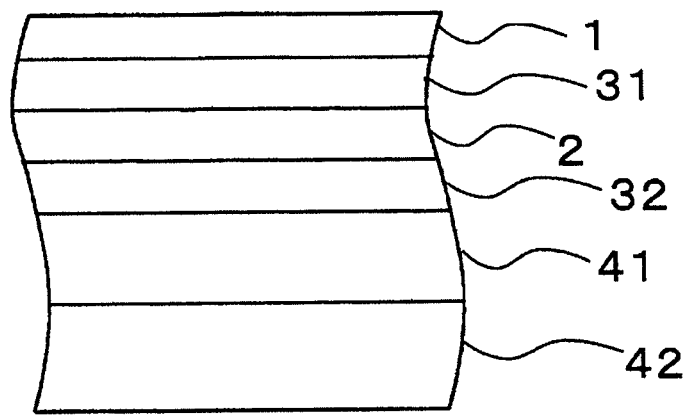
FIG. 4 is a partial cross-sectional view of still another modified example of the plastic film according to the invention.

FIG. 4 shows a layer structure of another example of the plastic film of the second aspect. The film is provided with six layers including, from the top, the first layer (outermost layer) 1, a second layer (first interlayer adhesive layer) 31, a third layer (oxygen absorbing layer) 2, a fourth layer (second interlayer adhesive layer) 32, a fifth layer (sealing layer maintaining transparency and flexibility) 41, and a sixth layer (direct-melt sealing layer) 42.

Figure 5:
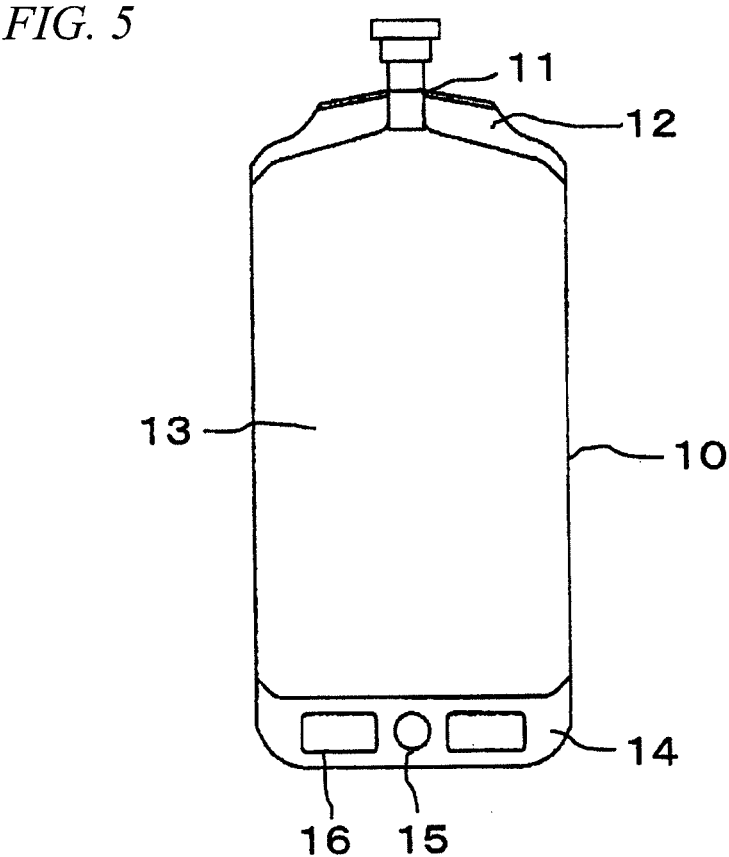
FIG. 5 is a plan view of an example of an infusion bag produced using the plastic film of the invention.

FIG. 5 shows an example of an infusion bag of the invention manufactured using the plastic film of the invention.

The infusion bag is a bag provided by forming a pouring opening 11 at a first edge of the main body of the infusion bag that is made of a tube-like plastic film 10, processing the pouring opening 11 with heat sealing, filling an infusion in an infusion containing part 13 having a first edge heat sealed part 12 as the bottom, and processing then a second edge with heat sealing. In the center of a second edge heat sealed part 14, a hanging hole 15 is formed by punching, and rectangular non-sealed parts 16 are provided in both sides thereof. At the tip of the pouring opening 11, a rubber plug into which an injection needle is inserted is provided. Furthermore, the pouring opening may also be a tube.

The plastic film of the invention is made into a film with multi layers in one process by a co-extrusion method for at least four layers or more. The co-extrusion is possible both in making a roll-shaped film by a multi-layered T die and in making a tubular film by multi-layered inflation. But when a medical container is made, it is preferable to be made in a tubular shape in which the inner surface of the film for containing a medicinal solution is rarely exposed to the outside. Furthermore, in order to exhibit high transparency, water-cooling co-extrusion inflation in which rapid cooling and solidifying from a melt state is performed is appropriate.

EXAMPLE

The invention will be described in further detail with examples.

A plastic film layer was foamed using different resins in the first layer, the second layer, the third layer, the fourth layer, and the sealing layer in Examples 1 to 4 and Comparative Examples 1 to 3. After that, steam autoclaving was performed for a specific film. And after the film that has undergone steam autoclaving and a film that has not undergone steam autoclaving stood still for 14 days, the dissolved oxygen concentration, the haze, the appearance, and the blocking property of the films were evaluated.

Resins used in each layer:

The resins used in the first layer, the second layer, the third layer, the fourth layer, and the sealing layer in Examples 1 to 4 and Comparative Examples 1 to 3 are as follows:

PA11: Nylon 11, made by Arkema, RILSAN "BESV 0 A FDA", density=1.02 g/cm$^3$, melting peak temperature=184° C.;

AD: Maleic anhydride-grafted polypropylene, ZELAS "MC721AP" made by Mitsubishi Chemical Corporation, density=0.89 g/cm$^3$, MFR=3.5 g/10 minutes, melting peak temperature=155° C.;

LLD: Linear low-density polyethylene, made by Prime Polymer Co., Ltd., Evolue "SP0511", density=0.903 g/cm$^3$, MFR=1.2 g/10 minutes, melting peak temperature=110.1° C.;

HD: High-density Polyethylene, made by Japan Polyethylene Corporation, Novatec, density=0.955 g/cm$^3$, MFR=3.5 g/10 minutes, melting peak temperature=132.4° C.;

ACT: A polyene-based polymer having an ethylene vinyl alcohol copolymer as the main component with an unsaturated double bond, made by Kuraray, Proact "XEP1190B", density=1.19 g/cm$^3$, MFR=4.0 g/10 minutes, melting peak temperature=191° C.; and EVOH: An ethylene vinyl alcohol copolymer, made by Kuraray, Eval "L171B", density=1.20 g/cm$^3$, MFR=4.0 g/10 minutes, melting peak temperature=191° C.

Furthermore, the mixture of 80 mass % of LLD and 20 mass % of HD was used for the sealing layers of Examples 1, 2 and Comparative Examples 1 to 3, and for the first layer of Comparative Example 3. The melting peak temperature of the mixture was 125° C.

The sealing layer of Example 4 was structured by two layers including 120 μm layer adjacent to the fourth layer constituted by LLD (80%) and HD (20%) and 10 μm direct-melt sealing layer that is adjacent to the fourth layer and constituted by 100% of HD.

Film-forming Method of Plastic Film Layer:

The formation of a plastic film was performed with a five-kind-five-layer or six-kind-six-layer water cooling inflation film-forming machine under the following conditions.

First layer: with a screw extruder having an outer diameter of 40 mm and a compression ratio of 2.7 (the extruding temperature of 200° C.)

Second layer: with a screw extruder having an outer diameter of 40 mm and a compression ratio of 2.7 (the extruding temperature of 200° C.)

Third layer: with a screw extruder having an outer diameter of 40 mm and a compression ratio of 2.7 (the extruding temperature of 200° C.)

Fourth layer: with a screw extruder having an outer diameter of 40 mm and a compression ratio of 2.7 (the extruding temperature of 200° C.)

However, the extruder for the fourth layer only performed a temperature rise in Example 2 and Comparative Example 2, not extrusion.

Sealing layer: with a screw extruder having an outer diameter of 65 mm and a compression ratio of 1.4 (the extruding temperature of 210° C.)

Die: an outer diameter of 200 mm, a lip clearance of 3 mm, and the temperature of 210° C.

Blow ratio: 0.6

Film-formation rate: 13 m/minute

Water cooling: a ring outer diameter of 120 mm, and the water temperature of 11.5° C.

The dissolved oxygen concentration and the haze were measured, and the appearance and the blocking property were evaluated after a bag is made from the obtained films.

Preparation of an evaluation sample and measurement of dissolved oxygen concentration:

Two films are cut out from the above-described film made in a tube shape, heat sealing was performed at temperature of 210° C. under pressure of 0.2 MPa for 0.5 seconds, and a three-side heat sealed bag with the inner dimension of 100 mm×100 mm was formed. In order to measure the dissolved oxygen concentration, a sensor chip for measuring dissolved oxygen concentration was fixed to the inner face of the three-side heat sealed bag with a dedicated adhesive. Distilled water having the dissolved oxygen concentration of 7.0 to 7.5 ppm was gently moved into a glass container with a lid that is connected to a vacuum pump in a room under a constant temperature of 23° C. The glass container that is hermetically sealed is put in an ultrasonic cleaning tub while ultrasonic waves were applied thereto and deaeration was performed for 10 minutes, and then distilled water having the dissolved oxygen concentration of 4.8 to 6.3 ppm was prepared. 100 ml of the prepared distilled water was gently moved to the three-side heat sealed bag, and the remaining one side thereof was swiftly hermetically sealed by heat sealing. Examples 1, 3, and 4, Comparative Examples 1 and 3 that have sealed hermetically underwent steam autoclaving at 121° C. for 25 minutes. After that, all samples stood still in a constant-temperature constant-humidity tub of 40° C. and 70% RH for 14 days. The samples that had stood still were taken out after 14 days and the temperatures of the samples were dropped to 23° C. in a room with a constant temperature of 23° C.

After passing the above-described process, the sensor chip of the samples was caused to perform detection to measure the dissolved oxygen concentration in the bag with a nondestructive oximeter (made by Sanyo Trading, Fibox-3 type).

Evaluation of the haze:

In Example 1, Example 3, Example 4, Comparative Example 1 and Comparative Example 3, two films were cut out from the above film prepared in a tube shape and heat sealing was performed the films at temperature of 210° C. under pressure of 0.2 MPa for 0.5 seconds, Thereby, the three-side heat sealed bag with the inner dimension of 100 mm×100 mm was formed. The bag was filled with 100 ml of distilled water, and one remaining side was hermetically sealed by heat sealing. Next, under the condition of the temperature of 121° C. and duration of 25 minutes, steam autoclaving was performed so that parts of the inner faces of the bag tightly contact each other. After that, the bag was swiftly opened, the distilled water was discharged, and normal state adjustment was performed for 14 days for the sample films of each Example and Comparative Example under the environment of temperature of 23° C. and humidity of 50% RH. The hazes of the sample films were measured through an operation based on JIS-K6714.

In Example 2 and Comparative Example 2, normal state adjustment was performed for the films formed in a tube shape for 14 days under the environment of temperature of 23° C. and humidity of 50% RH. The hazes of the sample films were measured through an operation based on JIS-K6714.

Preparation of an evaluation sample and evaluation of appearance and blocking:

As an evaluation sample, two films were cut out from the film formed in a tube shape, superimposed so that the sealing layers contacts each other, heat sealing was performed at temperature of 210° C. under pressure of 0.2 MPa, for 0.5 seconds. Thereby, a three-side heat sealed bag with the inner dimension of 100 mm×100 mm was prepared. The bag was filled with 50 mL of distilled water, the remaining one side was hermetically sealed by heat sealing. The bag was placed such that part of the inner faces of the bag tightly contacts each other, and steam autoclaving was performed under the condition of the temperature of 121° C. and the duration of 25 minutes. Observing the appearance of the bag after steam autoclaving, the presence of crinkles was visually evaluated.

In regard to evaluation of blocking, when the bag was opened after steam autoclaving, the inner surfaces of the bag could be completely separated from each other, but when at least some parts were found to tightly contact each other, it was determined to be "blocking found", and when no parts were found to tightly contact each other, it was determined to be "blocking not found".

The obtained results are shown in Table 1.

Among the sample films of Table 1, AD was provided as an interlayer adhesive layer in both sides of the oxygen absorbing layer in Examples 1, 3, and 4 and Comparative Examples 1 and 3. In Example 2 and Comparative Example 2, AD was provided only in one side, and the oxygen absorbing layer is adjacent to the outermost layer (first layer).

According to the result of the dissolved oxygen concentration, dissolved oxygen has not been detected in Examples 1, 3, and 4 in which ACT was used as an oxygen absorbing layer, but a high detection value has been shown in Comparative Examples 1 to 3 in which EVOH was used instead of an oxygen absorbing layer. It was found that it is necessary to use not only an ethylene vinyl alcohol copolymer as the main component but also a polyene-based polymer having an unsaturated double bond, in order to function as an oxygen absorbing layer.

When also Example 2 and Comparative Example 2 was compared, the dissolved oxygen concentration was measured in Comparative Example 2 in which EVOH was used instead of an oxygen absorbing layer even without undergoing steam autoclaving.

When attention is paid to the sealing layer, in regard to the result of blocking, there was no specific difficulties in using when the bag was opened after steam autoclaving, but at least some parts have been tightly contact each other, except in Example 4 in which the sealing layer has a two-layer structure. Therefore, from the result of Example 4, it was ascertained that the sealing layer does not show blocking, by including the direct-melt sealing layer only constituted by high-density polyethylene. However, it was found from Example 3 that, if the sealing layer is constituted only by linear low-density polyethylene, crinkles occur, and the haze further deteriorates than that in other examples.

Comparative Example 3 is a film using the same resin in the first layer as that of the sealing layer. The evaluation results of blocking and crinkles were the same as those of Example 1 and Comparative Example 1, but the haze deteriorated, and

TABLE 1

| Examples | First Layer | Second Layer | Third Layer | Fourth Layer | Sealing Layer | Steam Autoclaving | Dissolved Oxygen Concentration after 14 days of Standing-still | Haze (after 14 days of Standing-still) | Presence of Crinkles | Blocking |
|---|---|---|---|---|---|---|---|---|---|---|
| Example 1 | PA11 (10 μm) | AD (10 μm) | ACT (30 μm) | AD (10 μm) | LLD (80%) + HD (20%) (100 μm) | 121° C. and 25 minutes | 0 ppm | 13.7 | Not present | Found |
| Example 2 | PA11 (10 μm) | ACT (30 μm) | AD (10 μm) | None | LLD (80%) + HD (20%) (100 μm) | None | 0.2 ppm | 11.0 | — | — |
| Example 3 | PA11 (10 μm) | AD (10 μm) | ACT (30 μm) | AD (10 μm) | LLD (100%) (100 μm) | 121° C. and 25 minutes | 0 ppm | 17.0 | Present | Found |
| Example 4 | PA11 (10 μm) | AD (10 μm) | ACT (30 μm) | AD (10 μm) | LLD (80%) + HD (20%) (120 μm) HD (100%) (10 μm) | 121° C. and 25 minutes | 0 ppm | 15.1 | Not present | Not found |
| Comparative Example 1 | PA11 (10 μm) | AD (10 μm) | EVOH (30 μm) | AD (10 μm) | LLD (80%) + HD (20%) (100 μm) | 121° C. and 25 minutes | 6.3 ppm | 12.2 | Not present | Found |
| Comparative Example 2 | PA11 (10 μm) | EVOH (30 μm) | AD (10 μm) | None | LLD (80%) + HD (20%) (100 μm) | None | 5.2 ppm | 10.3 | — | — |
| Comparative Example 3 | LLD (80%) + HD (20%) (10 μm) | AD (10 μm) | EVOH (30 μm) | AD (10 μm) | LLD (80%) + HD (20%) (100 μm) | 121° C. and 25 minutes | 9.4 ppm | 17.7 | Not present | Found | further the result of the dissolved oxygen concentration showed remarkable deterioration.

When attention is paid to the difference between the melting peak temperature of the first layer and the melting peak temperature of the sealing layer, for example in Example 4, the difference is the first layer (184° C.: PA11)–the sealing layer (132° C.:

100% of HD), which is 52° C. However, since the same resin as that of the sealing layer was used for the first layer in Comparative Example 3, the difference of the melting peak temperatures is 0° C.

From the above results, it was found that the film of Example 4, which includes an outermost layer containing nylon 11 having 11 or more carbon atoms, ACT containing a polyene-based polymer having an unsaturated double bond as an oxygen absorbing layer, AD as interlayer adhesive layers provided in both sides of the ACT, which are a first interlayer adhesive layer and a second interlayer adhesive layer, and further includes both layers of a sealing layer maintaining general transparency and flexibility as a sealing layer and a direct-melt sealing layer, showed a slightly deteriorating haze, but had excellent oxygen absorbing performance, and was a favorable film without blocking and crinkles in the sealing layers.

INDUSTRIAL APPLICABILITY

The plastic film of the invention can be widely used in medical containers or the like for infusions, enteral nutrients, and the like since the film does not need an outer packaging material, not use an organic solvent-based adhesive, but efficiently absorbs dissolved oxygen in a medical solution, and does not have problems of being whitened during steam autoclaving.

| Reference Signs List | |
|---|---|
| 1 | outermost layer |
| 2 | oxygen absorbing layer |
| 3, 31, 32 | interlayer adhesive layer |
| 4 | sealing layer |
| 10 | plastic film |
| 11 | pouring opening |
| 12 | first edge heat sealed part |
| 13 | infusion containing part |
| 14 | second edge heat sealed part |
| 15 | hanging hole |
| 16 | non-sealed part |
| 41 | sealing layer for maintaining transparency and flexibility |
| 42 | direct-melt sealing layer |

The invention claimed is:

1. A plastic film used for a medical container which is composed at least of four layers, formed by a water-cooling inflation method of co-extrusion, and has an oxygen absorbing function, comprising in order from an outermost layer:
a first layer that contains a polyamide obtained from a ring-opening polymerization of a lactam having 11 or more carbon atoms or from polycondensation of an ω-amino acid having 11 or more carbon atoms, or a polyamide obtained from copolycondensation of a dicarboxylic acid having 10 or more carbon atoms and a diamine having 6 or more carbon atoms, wherein the first layer is the outermost layer;
a second layer that is adjacent to the first layer and contains as the main component an ethylene vinyl alcohol copolymer and as accessory components a transition metal salt and a polyene-based polymer having an unsaturated double bond;
a third layer that is adjacent to the second layer and contains a copolymer of an α-olefin and a monomer of an unsaturated carboxylic acid or an anhydride of an unsaturated dicarboxylic acid as the major component; and
a sealing layer that contains a polyethylene as the main component.

2. The plastic film used for a medical container according to claim 1, a layer of a mixed composition containing the ethylene vinyl alcohol copolymer as the main component and the transition metal salt and the polyene-based polymer having an unsaturated double bond as the accessory component absorbs 30 cc or more oxygen per gram, and the thickness of the layer of the mixed composition is 5 to 35% of the total thickness of the plastic film.

3. The plastic film used for a medical container according to claim 1, wherein the melting peak temperature of the first layer is 175° C. or higher, and the difference between the melting peak temperature of the first layer and the melting peak temperatures of the sealing layers is 40° C. or larger.

4. The plastic film used for a medical container according to claim 2, wherein the melting peak temperature of the first layer is 175° C. or higher, and the difference between the melting peak temperature of the first layer and the melting peak temperatures of the sealing layers is 40° C. or larger.

5. The plastic film according to claim 1, wherein the sealing layer is a mixture of 60 to 95 mass % of a linear low-density polyethylene and 5 to 40 mass % of a high-density polyethylene.

6. The plastic film according to claim 1, wherein the sealing layer includes two layers which are a layer that is adjacent to the third layer and has, as the main component, a co-polymer of an α-olefin and a monomer of an unsaturated carboxylic acid or an anhydride of an unsaturated dicarboxylic acid and a layer that is adjacent to the layer and composed of a high-density polyethylene.

7. The plastic film according to claim 2, wherein the sealing layer includes two layers which are a layer that is adjacent to the fourth layer and has, as the main component, a co-polymer of an α-olefin and a monomer of an unsaturated carboxylic acid or an anhydride of an unsaturated dicarboxylic acid and a layer that is adjacent to the layer and composed of a high-density polyethylene.

8. A plastic film used for a medical container which is composed at least of five layers, formed by a water-cooling inflation method of co-extrusion, and has an oxygen absorbing function, comprising in order from an outermost layer:
a first layer that contains a polyamide obtained from a ring-opening polymerization of a lactam having 11 or more carbon atoms or from polycondensation of an ω-amino acid having 11 or more carbon atoms, or a polyamide obtained from copolycondensation of a dicarboxylic acid having 10 or more carbon atoms and a diamine having 6 or more carbon atoms, wherein the first layer is the outermost layer;
a second layer that is adjacent to the first layer and contains a copolymer of an α-olefin and a monomer of an unsaturated carboxylic acid or an anhydride of an unsaturated dicarboxylic acid as the major component;
a third layer that is adjacent to the second layer and contains as the main component an ethylene vinyl alcohol copolymer and as accessory components a transition metal salt and a polyene-based polymer having an unsaturated double bond;

a fourth layer that is adjacent to the third layer and contains a copolymer of an α-olefin and a monomer of an unsaturated carboxylic acid or an anhydride of an unsaturated dicarboxylic acid as the major component; and a sealing layer that that contains a polyethylene as the main component.

9. The plastic film used for a medical container according to claim 8, a layer of a mixed composition containing the ethylene vinyl alcohol copolymer as the main component and the transition metal salt and the polyene-based polymer having an unsaturated double bond as the accessory component absorbs 30 cc or more oxygen per gram, and the thickness of the layer of the mixed composition is 5 to 35% of the total thickness of the plastic film.

10. The plastic film used for a medical container according to claim 8, wherein the melting peak temperature of the first layer is 175° C. or higher, and the difference between the melting peak temperature of the first layer and the melting peak temperatures of the sealing layers is 40° C. or larger.

11. The plastic film used for a medical container according to claim 8, wherein the melting peak temperature of the first layer is 175° C. or higher, and the difference between the melting peak temperature of the first layer and the melting peak temperatures of the sealing layers is 40° C. or larger.

12. The plastic film according to claim 8, wherein the sealing layer is a mixture of 60 to 95 mass % of a linear low-density polyethylene and 5 to 40 mass % of a high-density polyethylene.

13. The plastic film according to claim 8, wherein the sealing layer includes two layers which are a layer that is adjacent to the fourth layer and has, as the main component, a co-polymer of an α-olefin and a monomer of an unsaturated carboxylic acid or an anhydride of an unsaturated dicarboxylic acid and a layer that is adjacent to the layer and composed of a high-density polyethylene.

14. The plastic film according to claim 9, wherein the sealing layer includes two layers which are a layer that is adjacent to the fourth layer and has, as the main component, a co-polymer of an α-olefin and a monomer of an unsaturated carboxylic acid or an anhydride of an unsaturated dicarboxylic acid and a layer that is adjacent to the layer and composed of a high-density polyethylene.

15. An infusion bag in which a pouring opening is provided on the main body of the infusion bag formed of the plastic film according to any one of claims 1 to 14.

\* \* \* \* \*